United States Patent [19]

Iritani et al.

[11] Patent Number: 5,706,667
[45] Date of Patent: Jan. 13, 1998

[54] AIR CONDITIONING APPARATUS

[75] Inventors: Kunio Iritani, Anjo; Takahisa Suzuki, Kariya, both of Japan

[73] Assignee: Nippondenso Co., Ltd., Kariya, Japan

[21] Appl. No.: 658,118

[22] Filed: Jun. 4, 1996

[30] Foreign Application Priority Data

Jun. 6, 1995 [JP] Japan ................ 7-139704

[51] Int. Cl.$^6$ ............... F25B 29/00; F25B 1/00
[52] U.S. Cl. ............... 62/230; 62/186; 165/244; 165/248; 454/99
[58] Field of Search .............. 62/186, 230; 165/244, 165/248; 454/329, 99

[56] References Cited

U.S. PATENT DOCUMENTS 4,978,061  12/1990  Ogihara et al. ............. 62/186 X
5,102,041   4/1992  Fujiki et al. ................. 165/248

FOREIGN PATENT DOCUMENTS 52-25341  2/1977  Japan .
5-63922   8/1993  Japan .

Primary Examiner—William E. Wayner
Attorney, Agent, or Firm—Harness, Dickey & Pierce

[57] ABSTRACT

According to the present invention, when the inside air circulation mode is determined, the blower for blowing air to the heat exchanger is operated with the regular blower voltage. When the outside air introduction mode is determined, the blower is operated with the lower blower voltage lower than the regular blower voltage. As a result, consumed electric power of a compressor in the outside air introduction mode can be controlled and the deterioration of the efficiency of the refrigerating cycle in the inside air circulation mode can be prevented.

19 Claims, 7 Drawing Sheets

AIR AMOUNT SETTING SWITCH

AIR AMOUNT SETTING LEVER

AIR CONDITIONING APPARATUS

CROSS REFERENCE TO RELATED APPLICATION

This application is based on and claims priority of Japanese Patent Application No. Hei. 7-139704 filed on Jun. 6, 1995, the content of which is incorporated herein by reference.

BACKGROUND OF THE INVENTION

1. Field of the Invention

The present invention generally relates to an air conditioning apparatus for vehicles, in which outside or inside air having been sucked from an inside or an outside air inlet and heat-exchanged through a heat exchanger is blown into a passenger compartment and the heat exchange capacity is adjusted by electric power. More particularly, the present invention relates to an automotive air conditioning apparatus for electric vehicles.

2. Description of Related Art

For example, an electric vehicle has no heat source of hot water like a gasoline engine does. For this reason, the electric vehicle employs a heat pump type refrigerating cycle, in which a heat exchanger for forming a part of the heat pump cycle is disposed within the air conditioning duct and the compressor of the refrigerating cycle is driven by an electric motor. When heating the passenger compartment, the heat pump cycle is so selected as to switch the heat exchanger within the air conditioning duct to function as a condenser, and the air to be blown into the passenger compartment is heated with the heat of condensation by the condenser.

As a conventional type of the automotive air conditioning apparatus utilizing such heat pump cycle has been disclosed in JP-A-52-25341, for example. Specifically, when the air temperature at the intake side of the heat exchanger within the air conditioning duct is higher (in the cooling mode) or lower (in the heating mode) than the set value, the reduce load on the compressor is reduced by lowering the flow rate of the air passing through the heat exchanger.

However, according to this conventional apparatus, the outside/inside air switching mode is not considered at all when the air flow rate is reduced as described above. Accordingly, in this conventional apparatus, irrespective of the inside air circulation mode or the outside air circulation mode, the air flow rate is controlled when the air temperature at the intake side of the heat exchanger within the air conditioning duct is higher (in the cooling mode) or lower (in the heating mode) than the set value.

By the way, in the outside air introduction mode, unlike the inside air circulation mode, since low-temperature outside fresh air is sucked into the air conditioning duct in the winter time and high-temperature outside air is sucked into the air conditioning duct in the summer time, the air conditioning load on the heat exchanger is large and the load on the compressor is also large. As a result, the consumed electric power of the electric motor for driving the compressor is increased.

Therefore, the reduction in the air flow rate in the conventional apparatus as described above is effective in the outside air introduction mode, because the air conditioning load is reduced and the consumed electric power of the electric motor is restrained. However, in the inside air circulation mode, the efficiency of the refrigerating cycle is rather deteriorated, because air conditioning load is not reduced.

In a case where the inside of the passenger compartment is heated not by the heat pump cycle described above but by an electric heater, if the air flow rate is reduced in the outside air introduction mode, the consumed electric power of the electric heater is reduced, as well. However, in the inside air circulation mode, the reduction in the air flow rate is not effective.

SUMMARY OF THE INVENTION

In view of the above problem, it is an object of the present invention to provide an air conditioning apparatus, in which the inside air sucked from the inside air inlet or the outside air sucked from the outside air inlet is heat exchanged by the heat exchanger and then blown into the compartment and the heat exchanging capacity of the heat exchanger is electrically adjusted to control the amount of the air flowing into the heat exchanger according to the inside/outside air switching mode, capable of controlling the electric power required for adjusting the heat exchanging capacity of the heat exchanger and obtaining a high efficiency of the air conditioning system.

According to the present invention, the first air flow controlling means controls the air blowing means in such a manner that an air amount by the air blowing means is set to a first air amount when the inside air circulation mode is determined by the inside/outside air switching mode determining means. On the other hand, the second air flow controlling means controls the air blowing means in such a manner that the air amount by the air blowing means is set to a second air amount which is lower than the first air amount when the outside introduction mode is determined by the inside/outside air switching mode determining means.

When the air blowing means is driven, the inside air is sucked into the air passage in the inside air circulation mode or the outside air is sucked into the air passage in the outside air introduction mode. The inside air or outside air sucked is heat exchanged by the heat exchanger, the heat exchanging capacity of which is electrically controlled, and then blown from the air outlet into the compartment.

In the outside air introduction mode, the air amount of the air blowing means is the second air amount lower than the first air amount of the inside air circulation mode. Therefore, in the outside air introduction mode that requires larger air conditioning load, as the necessary heat quantity is small, the consumed electric power required for controlling the heat exchanging capacity of the heat exchanger can be small.

In the inside air circulation mode, as the air amount of the air blowing means is the first air amount, the deterioration of the refrigerating cycle efficiency can be prevented.

Further, the electric power reduction condition determining means for determining whether or not electric power for adjusting the capacity of the heat exchanging should be reduced (for detecting the conditions other than the condition that the outside air introduction mode is set to reduce the capacity of the heat exchanger) may be provided. In such a case, the air blowing means is controlled by the second air flow controlling means when the outside air introduction mode is determined by the inside/outside air switching mode determining means and a condition that the electric power should be reduced is determined by the electric power reducing condition determining means.

In this way, even in the outside air introduction mode, only when the electric power reducing condition determining means determines it necessary to reduce the electric power, the air amount of the air blowing means is set to the second air amount (lower than the first air amount), and when the electric power reducing condition determining means determines otherwise, as the air amount is set to the first air amount, more elaborate effect of controlling the consumed electric power can be obtained.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

The first embodiment in which the present invention is applied to an air conditioning apparatus for electric vehicles will now be described with reference to FIGS. 1 to 7.

Figure 1:
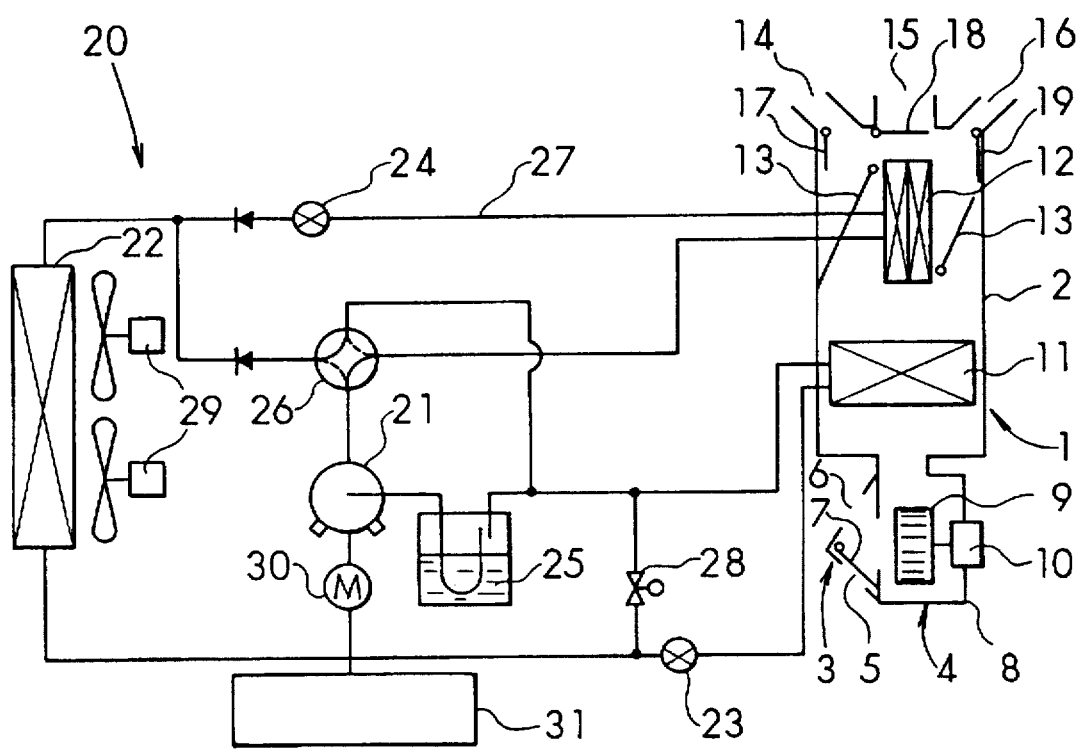
FIG. 1 is an overall construction view of a first embodiment according to the present invention.

In FIG. 1, an air conditioning duct 2 in an air conditioning unit 1 includes therein an air passage for introducing air into a passenger compartment. In the air passage, inside/outside air switching means 3 and air blowing means 4 are disposed at one side and plural air outlets 14 to 16 opened to the passenger compartment are formed on the other side.

The inside/outside air switching means 3 is provided with an inside/outside air switching door 7 within an inside/outside air switching box to selectively open/close an air inlet 5 for sucking the air from the inside of the passenger compartment (i.e., inside air) and an air inlet 6 for sucking the air from the outside of the passenger compartment (i.e., outside air). Both the air inlets 5 and 6 are formed within the inside/outside air switching box and the inside/outside air switching door 7 is driven by driving means (not illustrated) such as a servo motor. To this driving means is connected means 42 for detecting the position of the inside/outside air switching door 7 (specifically, a potentiometer illustrated in FIG. 2).

The air blowing means 4 generates air flow within the air conditioning duct 2 from the inside air inlet 5 or outside air inlet 6 to the air outlets 14 to 16. Specifically, a multiblade fan 9 is provided within a scroll casing 8 and the multiblade fan 9 is driven by driving means, i.e., a blower motor 10.

Within the air conditioning duct 2 on the downstream side of the multiblade fan 9 is provided an indoor cooling heat exchanger 11. The indoor cooling heat exchanger 11 forms a part of a refrigerating cycle 20 (described later) and functions as an evaporator for dehumidifying and cooling the air within the air conditioning duct 2 by the endothermic action of the refrigerant flowing therethrough in a cooling mode (described later). Conversely, the refrigerant does not flow into the indoor cooling heat exchanger 11 in a heating mode (described later).

Within the air conditioning duct 2 on the downstream side from the indoor cooling heat exchanger 11 is provided an indoor heating heat exchanger 12. The indoor heating heat exchanger 12 forms a part of the refrigerating cycle 20 and functions as a condenser for heating the air within the air conditioning duct 2 by the radiative action of the refrigerant flowing therethrough in the heating mode (described later). Conversely, the refrigerant does not flow into the indoor heating heat exchanger 12 in the cooling mode (described later).

Also within the air conditioning duct 2 is provided an air mix door 13 in a position adjacent to the indoor heating heat exchanger 12 to regulate the amount of the air supplied from the multiblade fan 9 to the indoor heating heat exchanger 12 and the bypass amount of the air supplied from the multiblade fan 9 and further flowing so as to bypass the indoor heating heat exchanger 12.

As for the air outlets 14 to 16 described above, there are specifically a defroster air outlet 14 for blowing out the conditioned air to the inside surface of the windshield glass, a face air outlet 15 for blowing out the conditioned air toward the upper half of the body of the passenger in the passenger compartment, and a foot air outlet 16 for blowing out the conditioned air at the lower half of the body of the passenger in the passenger compartment. On the upstream sides of these air outlets 14 to 16 are provided with doors 17 to 19 respectively to open/close the respective air outlets 14 to 16.

The above refrigerating cycle 20 is a heat pump type cycle in which the inside of the passenger compartment is cooled or heated by the indoor cooling heat exchanger 11 and the indoor heating heat exchanger 12. In addition to these heat exchangers 11 and 12, the refrigerating cycle 20 includes a refrigerant compressor 21, an outdoor heat exchanger 22, a pressure reducing apparatus 23 for cooling, a pressure reducing apparatus 24 for heating, an accumulator 25 and a four-way valve 26, all of which are connected with a refrigerant pipe 27. In FIG. 1, a solenoid valve 28 is disposed to control the flow of the refrigerant, and an outdoor fan 29 are disposed to blow out air toward the outdoor heat exchanger 22.

When driven by an electric motor 30, the refrigerant compressor 21 sucks, compresses and discharges the refrigerant. The electric motor 30 is integrally disposed with the refrigerant compressor 21 within a sealed-up casing. The rotational speed of the electric motor 30 continuously varies by the control of an inverter 31. The electric current supplied to the inverter 31 is controlled by an electronic control unit (ECU) 40 (FIG. 2).

Figure 2:
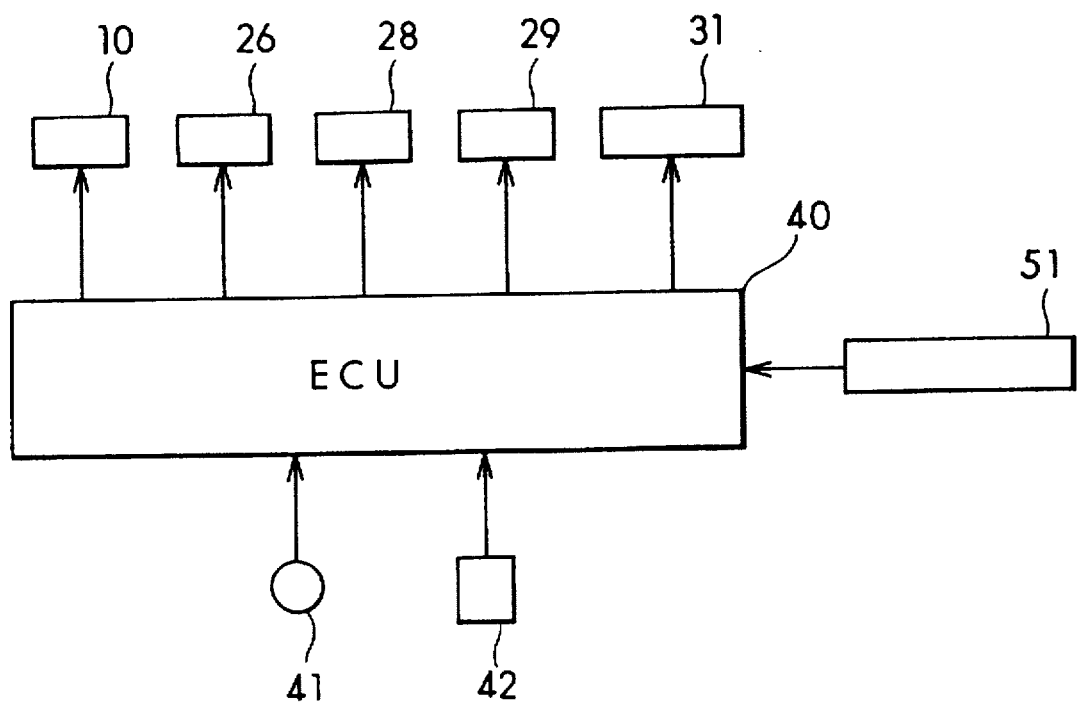
FIG. 2 is a block diagram of a control system of the first embodiment.

To the ECU 40, as illustrated in FIG. 2, is input each signal from an outside air temperature sensor 41 for detecting the temperature of the outside air and the potentiometer 42 described above. Also input to the ECU 40 is a signal from each lever and switch located on a control panel 51.

Figure 3:
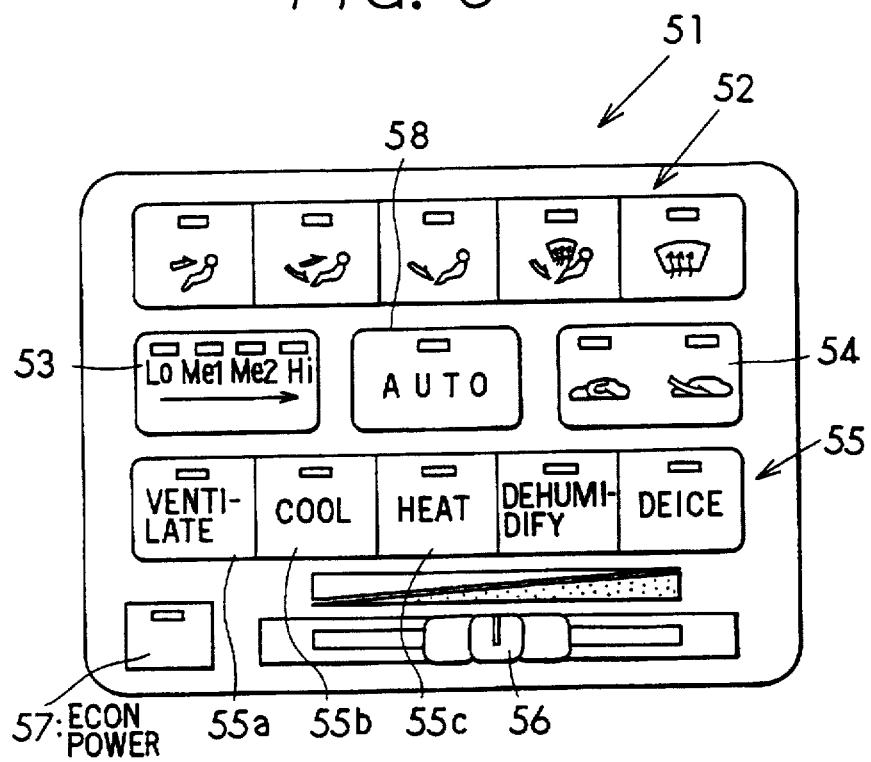
FIG. 3 is a front view of a control panel of the first embodiment.

As illustrated in FIG. 3, the control panel 51 is provided with a blow mode setting switch 52 for setting each blow mode, an air amount setting switch 53 for setting the amount of the air blown into the passenger compartment, an inside/outside air switching switch 54 for selecting the inside/outside air mode, an operation mode setting switch 55 for setting the operation mode of the refrigerating cycle 20, a temperature setting lever 56 for setting the temperature of the air blown into the passenger compartment, an economy power switch for setting the power saving mode of the consumed electric power of the electric motor 30, and an auto switch 58 for automatically controlling the operation of the multiblade fan 9 and refrigerating cycle 20.

The air amount setting switch 53 can set the air flow to any of four air flow modes: "Lo", "Me1", "Me2" and "Hi". Every time the air amount setting switch 53 is pressed, the setting air amount moves up from "Lo", to "Me1", to "Me2", and to "Hi" step by step in this order. Further, if the air amount setting switch 53 is pressed when "Hi" is set, the setting air amount returns to "Lo".

One of an inside air circulation mode in which the inside/outside air switching door 7 opens the inside air inlet 5 and closes the outside air inlet 6 and an outside air introduction mode in which the inside/outside air switching door 7 closes the inside air inlet 5 and opens the outside air inlet 6 is selected by the inside/outside air mode selecting switch 54.

The operation mode setting switch 55 described above includes an air blow switch 55a for selecting the operation/stop of the multiblade fan 9, a cooling switch 55b for selecting the ON/OFF of the cooling operation mode of the refrigerating cycle 20, and a heating switch 55c for selecting the ON/OFF of the heating operation mode of the refrigerating cycle 20 and the like.

The temperature setting lever 56 described above, according to the setting position thereof, sends out the target value of the air cooling degree of the indoor cooling heat exchanger 11 (specifically, the temperature of the air immediately after the exit from the indoor cooling heat exchanger 11) to the ECU 40 in the cooling operation mode and sends out the target value of the air cooling degree of the indoor heating heat exchanger 12 (specifically, the pressure of the refrigerant flowing through the indoor heating heat exchanger 12) to the ECU 40 in the heating operation mode.

The ECU 40 controls the inverter 31 in such a manner that the actual temperature of the air immediately after passing through the indoor cooling heat exchanger 11 is controlled to the target value in the cooling operation mode and the actual pressure of the refrigerant flowing through the indoor cooling heat exchanger 11 is controlled to the target value in the cooling operation mode.

Within the ECU 40 in FIG. 2 is provided a microcomputer (not illustrated) which includes CPU, ROM, RAM and the other components. Each signal from the outside air temperature sensor 41 and potentiometer 42 and each signal from the control panel 51 are input to the microcomputer through an input circuit (not illustrated) within the ECU 40.

The microcomputer executes a specified process (described later) and controls each of the driving means such as the inverter 31 described above based on the results of the execution. Electric power is supplied to the ECU 40 from a battery (not illustrated).

When the cooling switch 55b is pressed by a driver or a passenger in the passenger compartment, the microcomputer starts up the compressor 21 and controls the four-way valve 26 and the solenoid valve 28 in such a manner that the refrigerating cycle 20 is set to the cooling operation mode. In the cooling operation mode, the refrigerant flows through the compressor 21, the outdoor heat exchanger 22, the pressure reducing apparatus 23 for cooling, to the indoor cooling heat exchanger 11, the accumulator 25, and the compressor 21 in this order.

On the other hand, when the heating switch 55c is pressed by a driver or a passenger within the passenger compartment, the microcomputer starts up the compressor 21 and controls the four-way valve 26 and the solenoid valve 28 to set the refrigerating cycle 20 to the heating operation mode. In the heating operation mode, the refrigerant flows through the compressor 21, the indoor heating heat exchanger 12, the pressure reducing apparatus 24 for heating, the outdoor heat exchanger 22, the solenoid valve 28, the accumulator 25, and the compressor 21 in this order.

Figure 4:
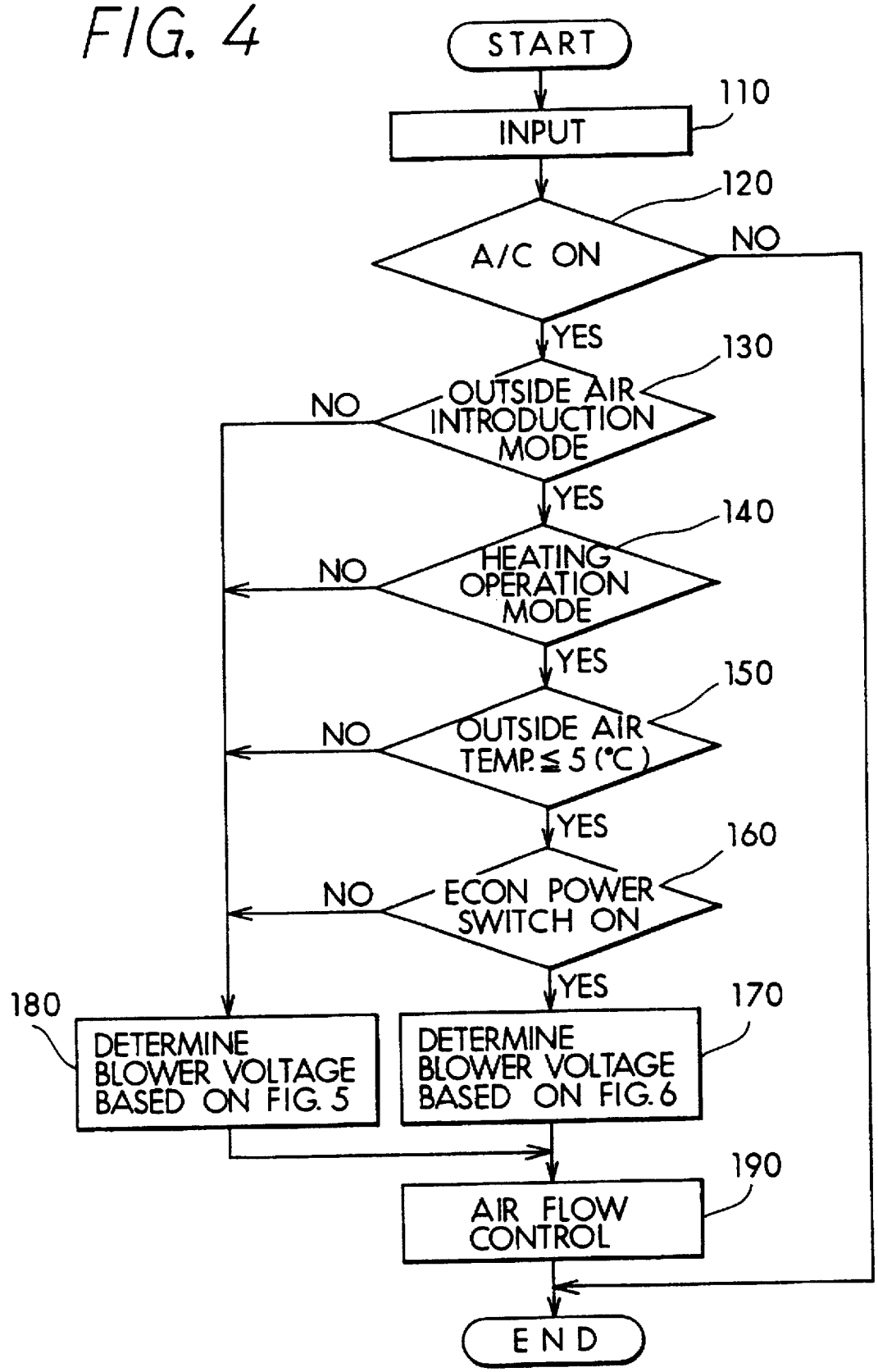
FIG. 4 is a flow chart illustrating an air flow control process of the first embodiment.

Referring to FIG. 4, the air flow control process executed by the microcomputer is described.

Firstly, when the key switch is turned ON and the main electric power is supplied to the ECU 40, the routine illustrated in FIG. 4 starts. In the step 110, each signal from the outside air temperature sensor 41, the potentiometer 42 and the levers and switches of the control panel 51 is read.

In the next step 120, it is determined whether or not the switch of the operation mode setting switch 55 other than the air blow switch 55a is in the ON position. When the determination is YES, the ECU 40 proceeds to the step 130; when the determination is NO, the ECU 40 exits the routine.

In the steps 130 to 160, it is determined whether the blower voltage to be applied to the blower motor 10 should be determined to be the regular voltage set for the regular air conditioning or to be lower voltage. When the determination is NO in any one of the steps 130 to 160, the ordinary blower voltage is adopted; when the determinations are YES in all the steps from 130 to 160, the lower voltage is adopted.

That is, in the step 130, it is determined whether or not the air mode is in the outside air introduction mode based on the signals from the potentiometer 42. Then, in the steps 140 to 160, it is determined whether or not the consumed electric power of the electric motor 30 should be lowered. Specifically, in the step 140, it is determined whether or not the refrigerating cycle 20 is in the heating operation mode by determining whether or not the heating switch 55c is in the ON position. Next, in the step 150, it is determined whether or not the outside air temperature is equal to or less than a specified lower outside air temperature (5° C. in this embodiment) based on the signals from the outside air temperature sensor 41. In the step 160, it is determined whether or not the economy power switch 57 is in the ON position.

Figure 5:
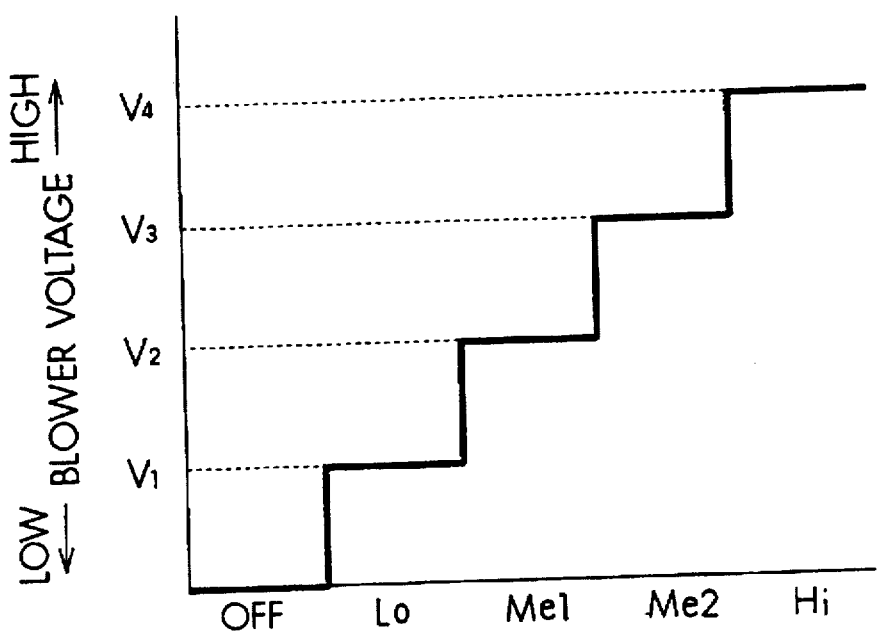
FIG. 5 is a map illustrating a relationship between the mode set by an air amount setting switch and the blower voltage according to the first embodiment.

In the step 180, which is performed when the determination is NO in any one of the steps 130 to 160, the blower voltage is determined so as to correspond to the mode actually set by the air amount setting switch 53 referring to the map in FIG. 5 stored in the ROM. For example, when the air amount setting switch is in the Lo mode position, the blower voltage is determined to be V1.

In the step 170, which is performed when the determination is YES in all the steps 130 to 160, the blower voltage is determined so as to correspond to the mode actually set by the air amount setting switch 53 referring to the map in FIG. 5 stored in the ROM. For example, when the air amount setting switch 53 is in the "Lo" mode position, the blower voltage is determined to be "V5" which is lower than the blower voltage "V1". Here, the one-dotted chain line in FIG. 6 indicates the blower voltage indicated by the solid line in FIG. 5.

After the step 170 or 180 is completed, in the next step 190, the blower voltage determined in the previous step 170 or 180 is applied to the blower motor 10, and then the ECU 40 exits the routine. Also when the determination is NO in the step 120, that is, neither cooling nor heating has been set, the ECU 40 exits the routine.

In this embodiment, as described above, when the determinations are YES in all the steps 130 to 160, the steps 170 and 190 are performed. As a result, the following effects can be obtained.

Figure 7:
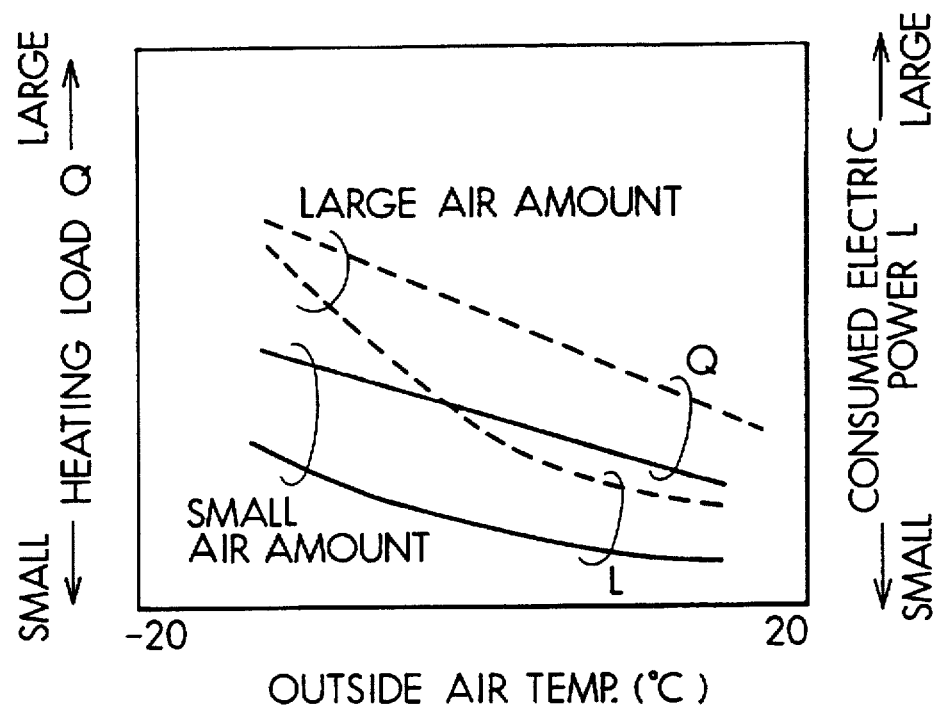
FIG. 7 is a chart illustrating the relationship between the heating load Q as well as the consumed electric power L and the outside air temperature or air amount according to the first embodiment.

As illustrated in FIG. 7, in the heating operation mode, the larger the heating load Q of the indoor heating heat exchanger 12 and the consumed electric power L of the electric motor 30 are, the lower the outside air temperature is. The heating load Q and the consumed electric power L are large when the amount of the air flowing to the indoor heating heat exchanger 12 is large as indicated by the broken line, and small when the amount of the air flowing through the heat exchanger 12 is small as indicated by the solid line.

In this embodiment, when the determinations are YES in all the steps 130 to 160, the steps 170 and 190 are performed, the heating load Q and the consumed electric power L can be controlled as indicated in the solid line in FIG. 7. As a result, the hating load of the indoor heating heat exchanger 12 can be reduced, and thereby the consumed electric power of the electric motor 30 can be reduced.

Furthermore, in this embodiment, when the determination is NO in the step 130, that is, when the air mode is in the circular air mode, the steps 180 and 190 are performed, in the inside air circulation mode, the air is blown at the regular air amount, and thereby the deterioration of the efficiency of the refrigerating cycle 20 can be prevented.

Moreover, in this embodiment, since the consumed electric power of the electric motor 30 can be reduced as described above, the shortening in the vehicle mileage due to the reduction in the consumed electric power of the electric motor 30 can be reduced.

Further, in this embodiment, in the heating mode, a high pressure is set with the temperature setting lever 56. When the air mode is set to the outside air introduction mode, low-temperature outside air is introduced into the intake side of the indoor heating heat exchanger 12 and the temperature of the air blowing into the passenger compartment slightly lowers. However, since the air amount is lowered at this time, the margin of reduction in the temperature of the blowing air can be made smaller or zero.

Next, a second embodiment according to the present invention is described.

Figure 6:
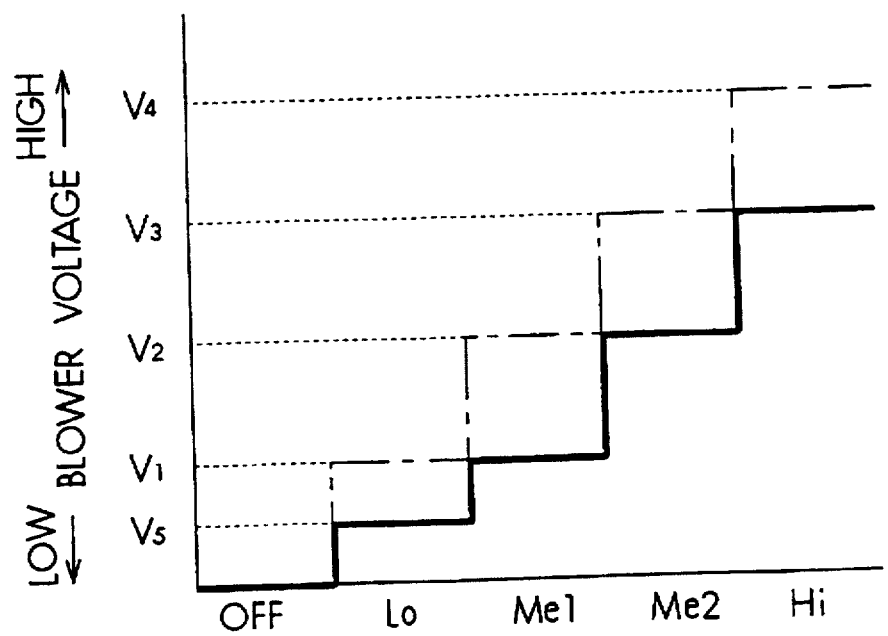
FIG. 6 is a map illustrating a relationship between the mode set by the air amount setting switch and the blower voltage according to the first embodiment.
Figure 8:
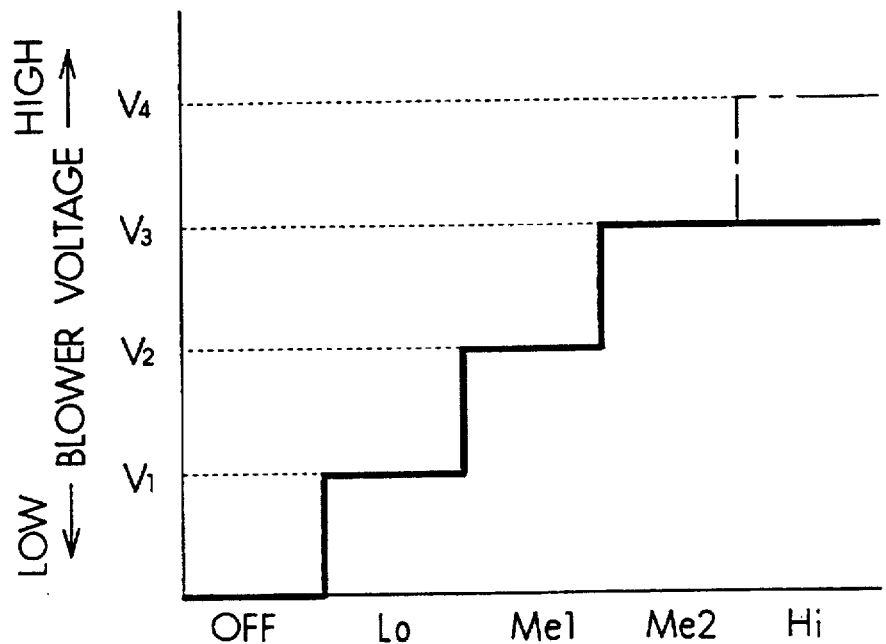
FIG. 8 is a map illustrating the relationship between the mode set by the air amount setting switch and the blower voltage according to the second embodiment.

In the step 170 of the first embodiment, the blower voltage is determined by referring to the map in FIG. 6. However, the blower voltage may be determined by referring to the map indicated in the solid line in FIG. 8. In the second embodiment, only when the air amount setting switch 53 is set to the "Hi" mode, in which the strongest air is blown out, the blower voltage is lowered. Since the air conditioning load is the largest in the "Hi" mode, the power saving effect of the electric motor 30 can be improved by lowering the blower voltage.

A third embodiment according to the present invention is described.

Figure 9:
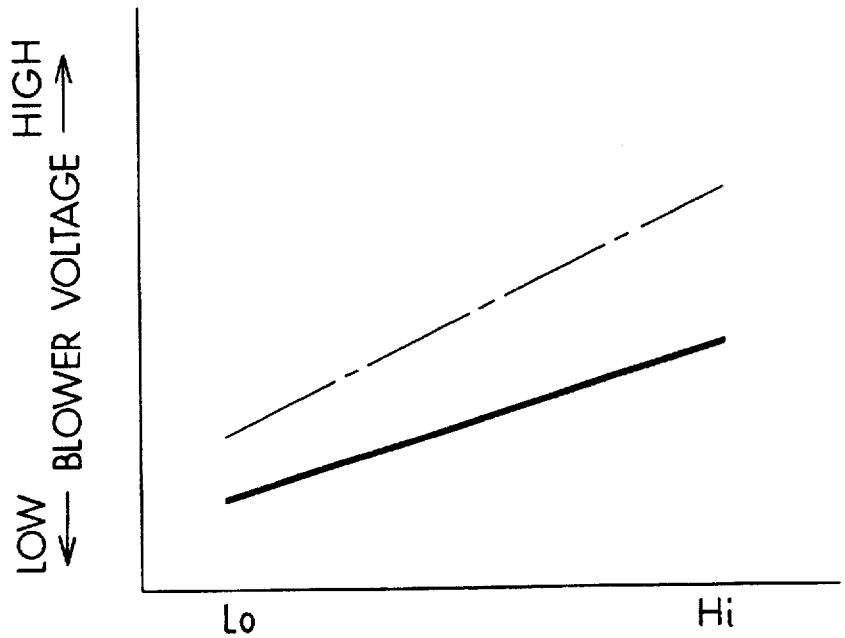
FIG. 9 is a map illustrating the relationship between the mode set by the air amount setting switch and the blower voltage according to the third embodiment.

Although the air amount setting switch 53 is of push-button switch type in the first and second embodiment, the air amount setting switch 53 may also be of slide-lever switch type as realized in the temperature setting lever 56. When the slide-lever switch type is employed, the blower voltage may be determined by referring to the map indicated by the solid line in FIG. 9 in the step 170 and by referring to the map indicated by one-dotted chain line in FIG. 9 in the step 180, for example.

Then, a fourth embodiment according to the present invention will be described now.

Although the blower voltage is manually set with the air amount setting switch 53 in the previous embodiments, the air flow rate may be automatically set. In the automatic setting, it may be so arranged that, for example, the target temperature (TAO) of the air blowing into the passenger compartment is obtained by means of calculation based on the setting temperature within the passenger compartment, the actual temperature within the passenger compartment, the amount of the sunlight and the like, the relations between the TAO and the blower voltage as illustrated in FIG. 10 are stored in the ROM, and the blower voltage according to the TAO is obtained from the map in FIG. 10.

Figure 10:
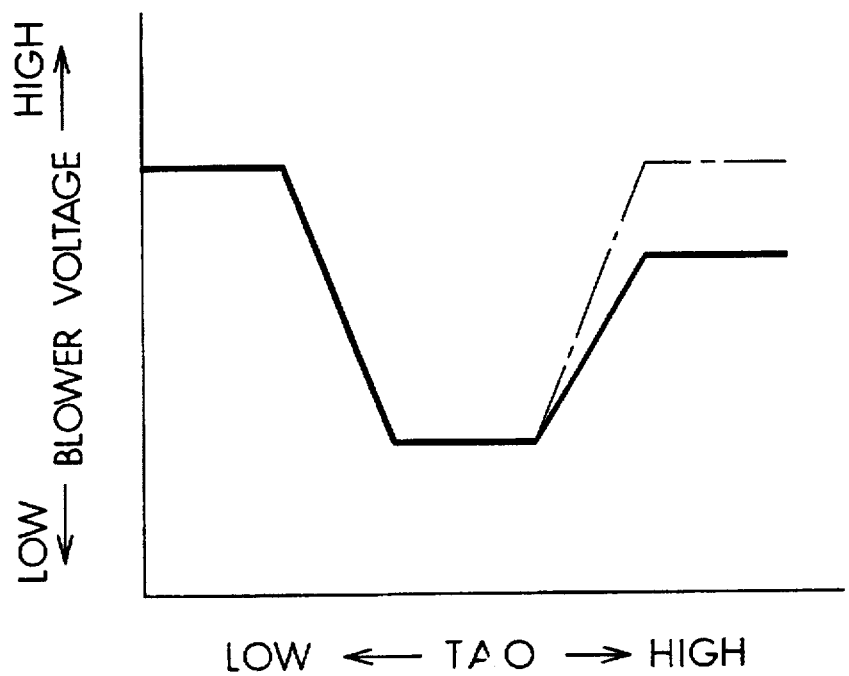
FIG. 10 is a map illustrating the relationship between the target blow air temperature (TAO) and the blower voltage according to the fourth embodiment.

In FIG. 10, the solid line indicates the blower voltage controlled in the steps 170 and 190, and the one-dotted chain line indicates the blower voltage controlled in the steps 180 and 190.

Figure 11:
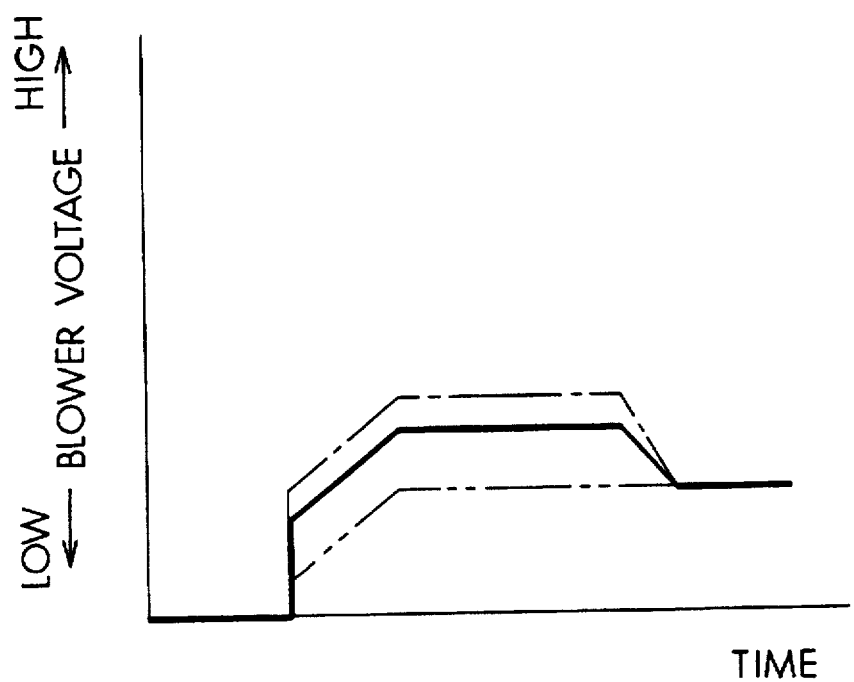
FIG. 11 is a map illustrating the change in the blower voltage according to the elapse of time.

FIG. 11 illustrates the change in the blower voltage with the time passage when the rapid heating is performed to heat the inside of the passenger compartment. Here, the solid line indicates the blower voltage controlled in the steps 170 and 190, the one-dotted chain line indicates the blower voltage controlled in the steps 180 and 190, and the two-dotted chain line indicates the blower voltage controlled with the air amount setting switch 53 manually set and fixed to "Lo" mode.

Further, either one of the steps 140 to 160 may be eliminated. That is, by performing the steps 170 and 190 in the outside air introduction mode and performing the steps 180 and 190 in the inside air circulation mode, it is possible to reduce the consumed electric power of the electric motor 30 and to prevent the efficiency of the refrigerating cycle 20 from being deteriorated.

In each of the embodiments described above, the high pressure is set with the temperature setting lever 56. However, the rotational speed of the compressor may be set with the temperature setting lever 56 to the set value. In this case, when the air mode is set to the inside air introduction mode, the low-temperature outside air is introduced into the intake side of the indoor heating heat exchanger 12 and thereby the temperature of the air blown into the passenger compartment is slightly lowered. At this time, however, as the air amount is reduced, the reduction margin of the blowing air temperature can be reduced or eliminated.

The heat exchangers 11 and 12 of the refrigerating cycle 20 may be replaced with electric heaters.

The air conditioning apparatus is used for electric vehicles in each of the embodiments described above, however, the air conditioning apparatus may also be used for rooms in a house or a building.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An air conditioning apparatus for a vehicle having a passenger compartment, said air conditioning apparatus comprising:

a casing having an air passage in which an inside air inlet for sucking air and an outside air inlet for sucking outside air are formed at one end and an air outlet for blowing out air into a passenger compartment is formed at the other end;

air inlet opening/closing means for selectively opening and closing said inside air inlet and said outside air inlet in such a manner that an inside air circulation mode where said inside air inlet is opened and said outside air inlet is closed or an outside air introduction mode where said outside air inlet is opened and said inside air inlet is closed is selectively set;

a heat exchanger provided in said air passage for heat exchanging with air in said air passage, a capacity of said heat exchanger being electrically controlled;

air blowing means for generating air flow within the air passage from said inside air inlet or said outside air inlet to said air outlet;

inside/outside air switching mode determining means for determining whether said air inlet opening/closing means is in said inside air circulation mode or in said outside air introduction mode;

first air flow controlling means for controlling said air blowing means in such a manner that an air amount by said air blowing means is set to a first air amount when said inside air circulation mode is determined by said inside/outside air switching mode determining means; and second air flow controlling means for controlling said air blowing means in such a manner that said air amount by said air blowing means is set to a second air amount which is lower than said first air amount when said outside introduction mode is determined by said inside/outside air switching mode determining means.

2. An air conditioning apparatus according to claim 1, wherein said first air amount is a regular air amount set for regular air conditioning.

3. An air conditioning apparatus according to claim 1, wherein said first air flow controlling means includes first air amount determining means for determining an air amount by said air blowing means as said first air amount when said inside air circulation mode is determined by said inside/outside air switching mode determining means in such a manner that an air amount of said air blowing means is set to said first amount; and said second air flow controlling means includes second air amount determining means for determining an air amount of said air blowing means as said second air amount when said outside air introduction mode is determined by said inside/outside air switching mode determining means in such a manner that an air amount of said air blowing means is set to said second air amount.

4. An air conditioning apparatus according to claim 3, wherein said second air amount determining means determines said second air amount in such a manner that at least the maximum air amount of said second air amount is lower than said maximum air flow amount of said first air amount.

5. An air conditioning apparatus according to claim 1, further comprising:

electric power reduction condition determining means for determining whether or not electric power for adjusting said capacity of said heat exchanging should be reduced, wherein said air blowing means is controlled by said second air flow controlling means when said outside air introduction mode is determined by said inside/outside air switching mode determining means and a condition that said electric power should be reduced is determined by said electric power reducing condition determining means.

6. An air conditioning apparatus according to claim 5, wherein said electric power reducing condition determining means includes an operation mode determining means for determining whether or not said heat exchanger is in a heating operation mode to heat air in said air passage, and said electric power is reduced when said heating operation mode is determined by said operation mode determining means.

7. An air conditioning apparatus according to claim 5, further comprising:

outside air temperature detecting means for detecting temperature of said outside air;

wherein said electric power reducing condition determining means includes outside air temperature determining means for determining whether or not said outside air temperature detected by said outside air temperature detecting means is equal to or lower than a predetermined outside air temperature, and said electric power is reduced when said outside air temperature detected by said outside air determining means is equal to or lower than said predetermined outside air temperature.

8. An air conditioning apparatus according to claim 5, further comprising:

an electric power saving instruction input means for inputting an instruction to save electric power for adjusting said capacity of said heat exchanger, said electric power reducing condition determining means including an electric power saving instruction determining means for determining whether or not said electric power saving instruction have been input to said electric power saving instruction input means, and said electric power is reduced when said electric power saving instruction has been input by said electric power saving instruction determining means.

9. An air conditioning apparatus according to claim 1, further comprising:

a compressor for forming a refrigerating cycle with said heat exchanger, and said compressor being driven by an electric motor.

10. An air conditioning apparatus according to claim 9, wherein said refrigerating cycle is a heat pump type refrigerating cycle.

11. An air conditioning apparatus according to claim 1, wherein said automotive air conditioning apparatus is for use in electric vehicles.

12. An air conditioning apparatus for conditioning air in a room, said air conditioning apparatus comprising:

a casing having an air passage in which an inside air inlet for sucking air and an outside air inlet for sucking outside air are formed at one end and an air outlet for blowing out air into a passenger compartment is formed at the other end;

air inlet opening/closing means for selectively opening and closing said inside air inlet and said outside air inlet in such a manner that an inside air circulation mode where said inside air inlet is opened and said outside air inlet is closed or an outside air introduction mode where said outside air inlet is opened and said inside air inlet is closed is selectively set;

a heat exchanger provided in said air passage for heat exchanging with air in said air passage, a capacity of said heat exchanger being electrically controlled;

air blowing means for generating air flow within the air passage from said inside air inlet or said outside air inlet to said air outlet;

inside/outside air switching mode determining means for determining whether said air inlet opening/closing means is in said inside air circulation mode or in said outside air introduction mode;

air flow controlling means for controlling said air blowing means in such a manner that an air amount by said air blowing means is set to a first air amount when said inside air circulation mode is determined by said inside/outside air switching mode determining means; and air amount changing means for controlling said air blowing means in such a manner that said first air amount is changed to a second air amount which is lower than said first air amount when said outside introduction mode is determined by said inside/outside air switching mode determining means.

13. An air conditioning apparatus according to claim 12, wherein said air amount by said air blowing means is selectively changed step by step independently from said air amount changing means.

14. An air conditioning apparatus according to claim 13, wherein said air amount changing means controls said air blowing means in such a manner that said first air amount is changed to said second air amount only when said air amount by said air blowing means is the maximum value.

15. An air conditioning apparatus according to claim 13, further comprising:

outside air temperature detecting means for detecting temperature of said outside air;

wherein said air amount changing means controls said air blowing means in such a manner that said first air amount is changed to said second air amount only when said outside air temperature detected by said outside air determining means is equal to or lower than said predetermined outside air temperature.

16. An air conditioning apparatus according to claim 13, further comprising:

an electric power reduction condition determining means for determining whether or not electric power for adjusting said capacity of said heat exchanging should be reduced;

an electric power saving instruction input means for inputting an instruction to save electric power for adjusting said capacity of said heat exchanger, wherein said electric power reducing condition determining means includes an electric power saving instruction determining means for determining whether or not said electric power saving instruction have been input to said electric power saving instruction input means, said air amount changing means controls said air blowing means in such a manner that said first air amount is changed to said second air amount only when said electric power saving instruction has been input by said electric power saving instruction determining means.

17. An air conditioning apparatus according to claim 13, further comprising:

a compressor for forming a refrigerating cycle with said heat exchanger, and said compressor being driven by an electric motor.

18. An air conditioning apparatus for conditioning air in a room, said air conditioning apparatus comprising:

a casing having an air passage in which an inside air inlet for sucking air and an outside air inlet for sucking outside air are formed at one end and an air outlet for blowing out air into a passenger compartment is formed at the other end;

air inlet opening/closing means for selectively opening and closing said inside air inlet and said outside air inlet in such a manner that an inside air circulation mode where said inside air inlet is opened and said outside air inlet is closed or an outside air introduction mode where said outside air inlet is opened and said inside air inlet is closed is selectively set;

an air conditioning unit provided in said air passage for conditioning air in said air passage, said air conditioning unit including a compressor and a heat exchanger for forming a refrigerating cycle, a capacity of said air conditioning unit being electrically controlled;

air blowing means for generating air flow within the air passage from said inside air inlet or said outside air inlet to said air outlet, said blowing means being electrically controlled;

inside/outside air switching mode determining means for determining whether said air inlet opening/closing means is in said inside air circulation mode or in said outside air introduction mode;

air flow controlling means for controlling said air blowing means in such a manner that an air amount by said air blowing means is set to a first air amount when said inside air circulation mode is determined by said inside/outside air switching mode determining means; and air amount changing means for controlling said air blowing means in such a manner that said first air amount is changed to a second air amount which is lower than said first air amount when said outside introduction mode is determined by said inside/outside air switching mode determining means.

19. An air conditioning apparatus according to claim 18, wherein said air amount by said air blowing means is selectively changed step by step independently from said air amount changing means.

* * * * *